June 25, 1968  M. ALLEN  3,389,997
PROCESS FOR RECOVERING INTRA-CELLULAR PROTEINS
Filed Aug. 3, 1966
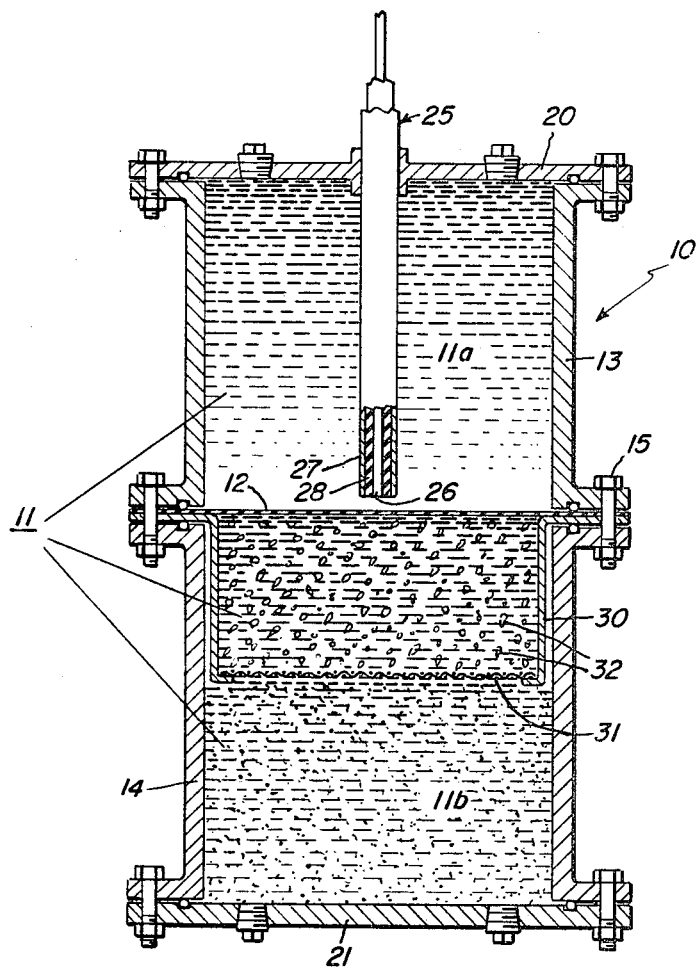
Inventor:
Merton Allen,
by Richard G. Speer
His Attorney.

United States Patent Office 3,389,997
Patented June 25, 1968

3,389,997
PROCESS FOR RECOVERING INTRA-CELLULAR PROTEINS
Merton Allen, Schenectady, N.Y., assignor to General Electric Company, a corporation of New York
Filed Aug. 3, 1966, Ser. No. 569,945
3 Claims. (Cl. 99—14)

ABSTRACT OF THE DISCLOSURE

Intra-cellular proteins locked within plant and animal cells are recovered for nutritional use by a process which includes as a key step subjecting the source material to electrohydraulic shock waves which break the material open and release the intra-cellular proteins into the surrounding liquid medium.

---

This invention relates to the recovery of proteins and more particularly to a new process for separating intra-cellular proteins from parent materials containing these substances.

Probably the single most important element of dietary intake for humans and animals is proteins, since this class of materials constitutes the fundamental building block of living matter. Very broadly speaking, the two basic types of protein are (1) the intra-cellular proteins, and (2) the extra-cellular proteins. The intra-cellular proteins are found in both plant and animal cells. Those proteins present in plants include albumins, globulins, glutelins, glutamines, nucleoproteins, protamines and cytoplasmic proteins. The intra-cellular animal protein, by way of comparison, comprises albumins, globulins, histones, protamines and nucleoproteins. As mentioned above, proteins are basic intake requirements for humans and animals, if sound health and growth are to be obtained. In recent years, the large population increases throughout the world have either caused or aggravated food and dietary shortages that result in widespread hunger and malnourishment. To meet the growing world food problem, it becomes increasingly imperative that enlarged sources of nutritious food stuffs be found and be made available. One important way for extending food sources is to improve the nutritive value of foods characteristically low in those materials conducive to sound health. For example, starchy materials such as flour and the various foods made from flour, can be materially improved in nutritive value by fortifying it with proteins extracted from other plant or animal sources. Of course, proteins can be used as food supplements for feeding livestock and other domesticated animals to improve the production of animals for human use and/or consumption.

Intra-cellular proteins can be obtained from a wide variety of plant materials such as cereals, oleaginous and leguminous seeds, leaves and grasses, peanuts, tung nuts, cashew nuts, etc. copra, wheat, rye, oats, corn, soybeans, cotton seeds, sesame seeds, tree leaves, vegetable tops, leafy vegetables and all wild and domestic grasses. Similarly, intra-cellular protein can be recovered from all animal sources. However, the most important potential source of animal protein is from fish, due to their comparative availability and the fact that many types of fish which would otherwise never be utilized can be used for protein recovery.

It is a principal object of this invention to provide an improved process for recovering intra-cellular proteins from parent materials having this type of protein.

Other objects and advantages of this invention will be in part obvious and in part explained by reference to the accompanying specification and drawings.

In the drawings, the figure shows a preferred form of apparatus which can be used to recover intra-cellular proteins in accordance with the present invention.

Generally, the present process for recovering proteins from parent materials having intra-cellular proteins comprises placing a mixture of the parent material with a suitably chosen liquid medium into a reaction chamber where it can be subjected to a shock wave created by means of an electrohydraulic arc discharge located in operative relationship with respect to the protein bearing material liquid medium mixture. Operation of the electrode creates a shock wave or pressure gradient that travels outwardly away from the electrode and through the parent material—liquid medium mixture causing proteins to be separated from the parent material.

The present invention can best be described by referring to the drawings which show an apparatus suitable for carrying out the process of the invention. Specifically, the apparatus comprises a container or vessel 10 which defines a reaction chamber 11 and this chamber being divided into upper and lower parts (11a, 11b) by means of a separating diaphragm 12. The container 10 is conveniently constructed of two sections 13 and 14 so that the diaphragm 12 can be fitted between them. The sections 13 and 14 are held together by appropriate means such as the nut and bolt combinations 15 that extend through the flanges on the two container sections. The upper end of section 13 is closed by an end cap 20 and the lower end of section 14 by end cap 21.

An electrode 25 extends into the upper portion 11a of reaction chamber 11 through an appropriate opening located in end cap 20. This electrode, the construction of which is unimportant to the present invention, comprises an inner electrode 26, an outer electrode 27 and an insulating layer 28 which separates the inner and outer electrodes. Upon connecting the electrode to an appropriate source of electricity such as a capacitor bank, arcing can be made to occur between electrodes 26 and 27 to create a shock wave within the medium contained in container 10. Also shown within container 10 is a receptacle 30 which has a perforate bottom 31, for purposes subsequently explained.

Turning now to the process, initially a quantity of parent material having intra-cellular protein is placed within reaction chamber 11 and, further, within the receptacle 30. The material is mixed with a suitable liquid carrier so that reaction chamber 11 is filled. The diaphragm 12 and the upper section 13 are placed in position and the portion of chamber 11 defined by section 13 is filled with a suitable fluid. This fluid need not be the same as that mixed with the protein bearing material although it can be if desired. After the apparatus has been charged with material, the electrode 25 is discharged so that a shock wave is generated which will be transmitted through diaphragm 12 on into the lower reaction chamber 11b. Travel of the shock wave through the mixture causes the particles, indicated by the numeral 32, to give up protein. Additionally, it has been found that if the perforate separator 31 is present, the protein bearing material is forced through the openings therein and physically disintegrated. This physical action further aids in the recovery of protein. It should be noted that the apparatus shown and described is given by way of example since many modifications would readily suggest themselves to those skilled in the art without departing from the scope of the invention.

As an example of the effectiveness of the present process in recovering protein, a reaction apparatus similar to that shown in the drawings was charged with a mixture of decorticated whole peanuts in a 10 percent saline solution. The ratio of solid to liquid was 1:5, e.g., 200 grams of peanuts in 1000 milliliters of 10 percent saline solution. Control samples were prepared identically but received no electrohydraulic discharge. The following operating conditions were used to effect the process:

(1) 10 kv.
(2) 24 microfarads
(3) 1200 joules
(4) 1/8" spark gap
(5) the electrode was located 1.7 centimeters from the diphragm.

The following table shows the number of discharges to which the mixture was subjected and the percentage of protein material (in terms of initial peanut weight) removed.

TABLE I

| No. of discharges: | Percent protein extracted |
|---|---|
| 120 | 11 |
| 180 | 28 |
| 240 | 58 |
| 300 | 65 |

Since a peanut contains about 65 percent protein, almost total recovery is obtained at about 300 discharges. Comparing these results with the controls (which were not subjected to shock) as shown in the following Table II, it can readily be seen that the electrohydraulic discharges significantly improve protein recovery.

TABLE II

| Control No. | Mixing Time, hrs. | Percent Protein Extracted |
|---|---|---|
| 1 | 1.5 | 4 |
| 2 | 1.5 | 5 |
| 3 | 1.5 | 6 |
| 4 | 2.5 | 9 |

It was pointed out earlier that the presence of the perforate member 31 further improved the recovery of protein from the parent material. To illustrate this improvement, decorticated, defatted peanut meal was suspended in a 10 percent sodium chloride solution (pH 8.0) in the proportion of one part of solid to five parts of liquid. Electrohydraulic operation was at 15 kv., 5/16 inch spark gap with a gap resistance of 7400 ohms. The sample chamber was separated from the arcing chamber by a suitable diaphragm. Within the sample chamber was a 1/24 inch grid plate through which the peanut solids were forced by the action of the shock wave. The total energy input at all capacitances was 67,500 joules. The results were as follows:

12 $\mu$f. capacitance

| | Percent of available protein extracted |
|---|---|
| Peanut meal passed through grid | 62 |
| Peanut meal not passed through grid | 52 |

18 $\mu$f. capacitance

| | |
|---|---|
| Peanut meal passed through grid | 70 |
| Peanut meal not passed through grid | 62 |

24 $\mu$f. capacitance

| | |
|---|---|
| Peanut meal passed through grid | 71 |
| Peanut meal not passed through grid | 63 |

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. The method for recovering proteins from peanut-like material which comprises the steps of filling with a mixture of peanut-like material and a liquid carrier a first compartment of a reaction chamber divided into a first compartment and second compartment by a flexible diaphragm, positioning an electric arc-generating electrode in the second compartment, filling the second compartment with a liquid, and thereafter subjecting the peanut-like material to a series of electrohydraulic shock waves and thereby separating proteins from the said material by repeatedly discharging the electrode and producing shock waves which are transmitted by the flexible diaphragm to the mixture in the first compartment.

2. The method of claim 1 in which a screen is disposed in the first compartment and the peanut-like material is forced through the screen by the action of the shock waves.

3. The method for recovering proteins from materials such as peanuts and cereals and animal tissues having intra-cellular proteins which comprises at least partially filling with a mixture of said intra-cellular protein material and a liquid carrier a first compartment of a reaction chamber divided into a first compartment and a second compartment by a flexible diaphragm, positioning an electric arc-generating electrode in the second compartment, filling the second compartment with a liquid at least to the extent that a portion of the diaphragm is disposed between and in contact with the mixture and the liquid in the two compartments and the arc-generating portion of the electrode is submerged in the liquid, and thereafter subjecting the said mixture to a series of electrohydraulic shock waves and thereby separating intra-cellular proteins from the said material by repeatedly discharging the electrode and producing shock waves which are transmitted by the flexible diaphragm to the mixture in the first compartment.

References Cited

UNITED STATES PATENTS

| 2,559,227 | 7/1951 | Rieber | 204—157 |
| 2,754,211 | 7/1956 | Siefker | 99—14 |
| 2,932,552 | 4/1960 | Weiss et al. | 210—19 X |
| 3,227,642 | 1/1966 | Lemelson | 204—193 X |
| 3,305,481 | 2/1967 | Peterson | 210—19 |

REUBEN FRIEDMAN, *Primary Examiner.*

J. DE CESARE, *Assistant Examiners.*